Patented July 5, 1927.

1,635,013

UNITED STATES PATENT OFFICE.

PAUL C. SEEL, OF ROCHESTER, NEW YORK, ASSIGNOR TO EASTMAN KODAK COMPANY, OF ROCHESTER, NEW YORK, A CORPORATION OF NEW YORK.

PROCESS FOR REDUCING THE VISCOSITY CHARACTERISTICS OF CELLULOSE ETHERS.

No Drawing.    Application filed December 16, 1925.   Serial No. 75,889.

This invention relates to processes for reducing the viscosity characteristics of cellulose ethers. One object of the invention is to provide a relatively simple, inexpensive and accurately repeatable process for lowering the viscosity of cellulose ethers. Another object of the invention is to provide as a product cellulose ether in a colloidized state, having slight acidity and capable of producing flexible coatings and films, while at the same time it has both low viscosity characteristics and high solubility in the usual cellulose ether solvents. Other objects will hereinafter appear.

In U. S. Patent, 1,188,376, Lilienfeld, June 20, 1916, there are disclosed a series of alkyl ethers of cellulose. Certain of these are practicably insoluble in water, and since they are the most important members of the series, for the purposes of coating and film manufacture, I shall describe my invention in connection with such water-insoluble ethers. But it will be understood that my invention is not restricted to treating them, except as indicated in the appended claims.

When cellulose ethers are made into coating compositions or lacquers, or are made into dopes from which films are prepared, such ethers are dissolved in a volatile solvent along with other less volatile materials. The solutions thus produced are spread upon the surfaces to be covered in various ways. In the case of lacquers especially, the solutions are often sprayed. In order to economize solvent, and obtain a coating of the proper thickness by a reasonably inexpensive operation, the solution for spraying should contain a high percentage of cellulose ether. But the ethers ordinarily produced, by the methods described in the above cited patent, give highly viscous concentrated solutions in the ordinary solvents. If the method of making the ethers is modified so that the ethers have low viscosity, when in concentrated solution, then the films or coatings produced from such solutions are very brittle. It is, therefore, highly desirable to convert the usual high viscosity ethers into ethers which will have high solubility and low viscosity, and at the same time will yield films and coatings of excellent flexibility.

I have found that ethers of high viscosity characteristics can be converted into those of low viscosity characteristics, while maintaining their ability to form flexible films, by heating such ethers while in the solid colloidized state and in a slightly acid condition. The incubation, by means of which the reduction is brought about, is, of course, not carried out at a temperature or for a time which will impair the product by charring it or badly discoloring it. The most useful range of temperatures lies between 50° C. and 100° C., but I do not wish to be restricted within these exact limits.

I shall now give one way of carrying out my process, but it will be understood that the invention is not limited to it, except as indicated in the appended claims.

A celluose ether of high viscosity characteristics is dissolved in a mixture of equal parts of benzol and ethyl alcohol. As much as one part of the ether, say water-insoluble ethyl cellulose can be dissolved in 4 parts of the solvent. This produces a heavy molasses-like dope or solution.

The dope thus produced should be very slightly acid,—that is, should have an acidity greater than that indicated by pH5. This measurement of the acid is explained in "The Determination of Hydrogen Ions," by Clark, published in 1920 by the Williams and Wilkins Company, Baltimore, Maryland. In the ordinary manufacture of cellulose ethers, such as water-insoluble ethyl celluloses, they are washed with acid, and then with water. Even quite prolonged washing with water still leaves small traces of acid present in the ether, probably in adsorbed condition.

The above described heavy dope is then converted into a form, having a large surface relative to its mass, and the solvents are evaporated until the cellulose ether is left in solid colloidized form in which the very slight acidity persists. This is most readily accomplished by spreading the dope in a film forming mechanism, and thus obtaining easily handled films. The technique of film-forming follows the usual well known practice.

The films thus obtained are then incubated, preferably at 65° C. for a prolonged time. The duration of this incubation is best determined by test, representative samples of the treated film being removed and dissolved at intervals, in order to test the viscosity. The incubation may be carried on for one day up to weeks or even months.

When the tests show that the desired lowering of the viscosity characteristics of the cellulose ether has been attained, the film is redissolved in the original solvent (benzol-ethyl alcohol) or any other suitable solvent. Where the treatment has been continued for several weeks, a much larger proportion of the ether may be dissolved and yet the solution will be of low viscosity. I have, for instance, by means of the above described treatment, converted a water-insoluble cellulose ether which yielded molasses-like dopes when one part of it was dissolved in four parts of benzol-ethyl alcohol, into a form in which one part of it could be dissolved in three parts of benzol-ethyl acohol and yet yield a solution of very low viscosity. This solution was sprayable, and yielded coatings or films of good flexibility.

Having thus described my invention, what I claim as new and desire to secure by Letters Patent is:

1. The process of reducing the viscosity characteristics of cellulose ether, which comprises bringing said ether into solid colloidized form with a greater acidity than pH5, and heating said ether while in said form at a temperature between 50° C. and its decomposition temperature until its viscosity characteristics are lowered.

2. The process of reducing the viscosity characteristics of cellulose ether while in the form of film with an acidity greater than pH5, which comprises heating said film at a temperature between 50° C. and 100° C. until the viscosity characteristics of said ether are lowered.

Signed at Rochester, New York, this 8th day of December, 1925.

PAUL C. SEEL.